June 24, 1930. J. N. REESE 1,765,772
SANDING DEVICE FOR AUTOMOBILES AND THE LIKE
Filed Sept. 18, 1926 3 Sheets-Sheet 2
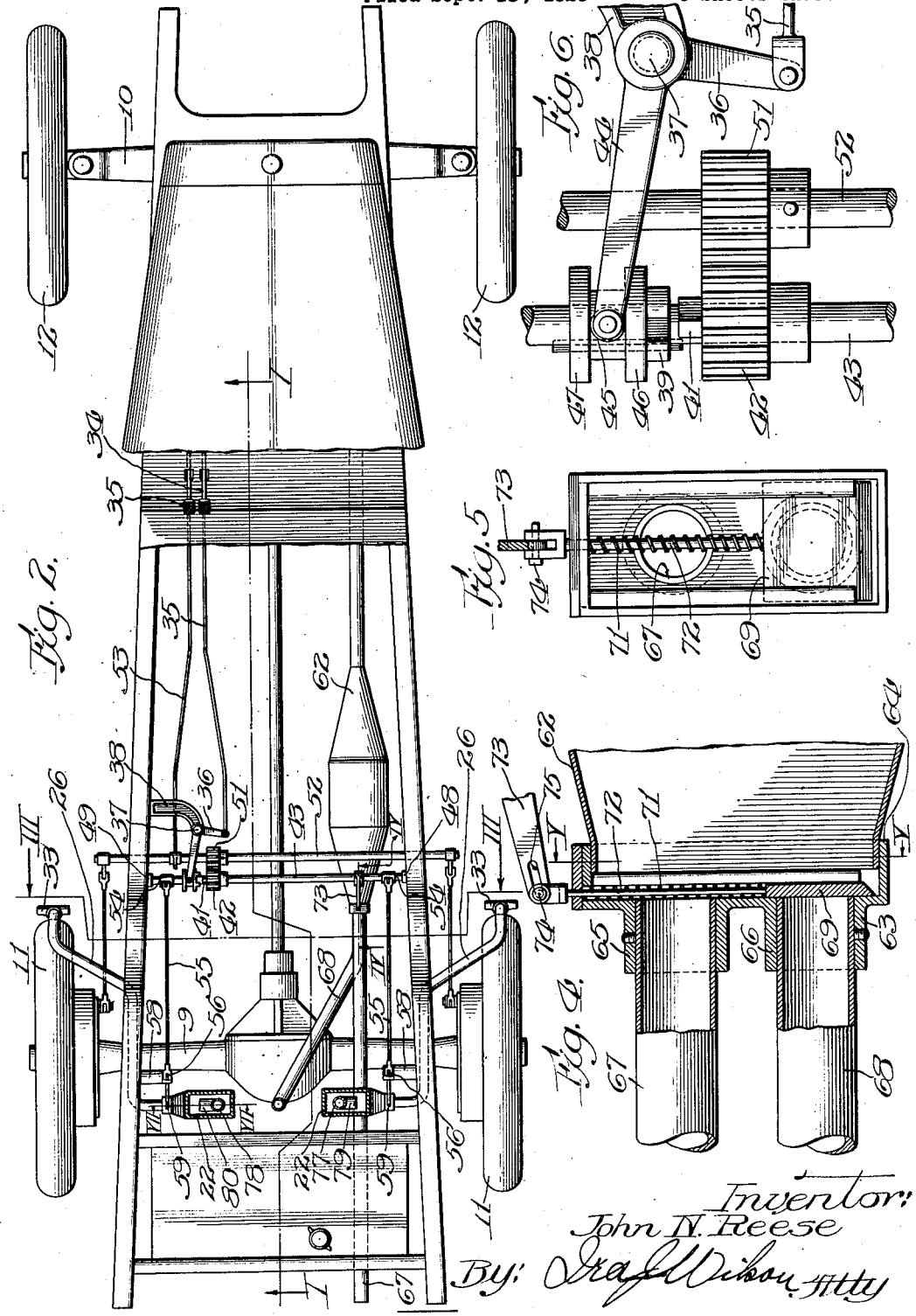

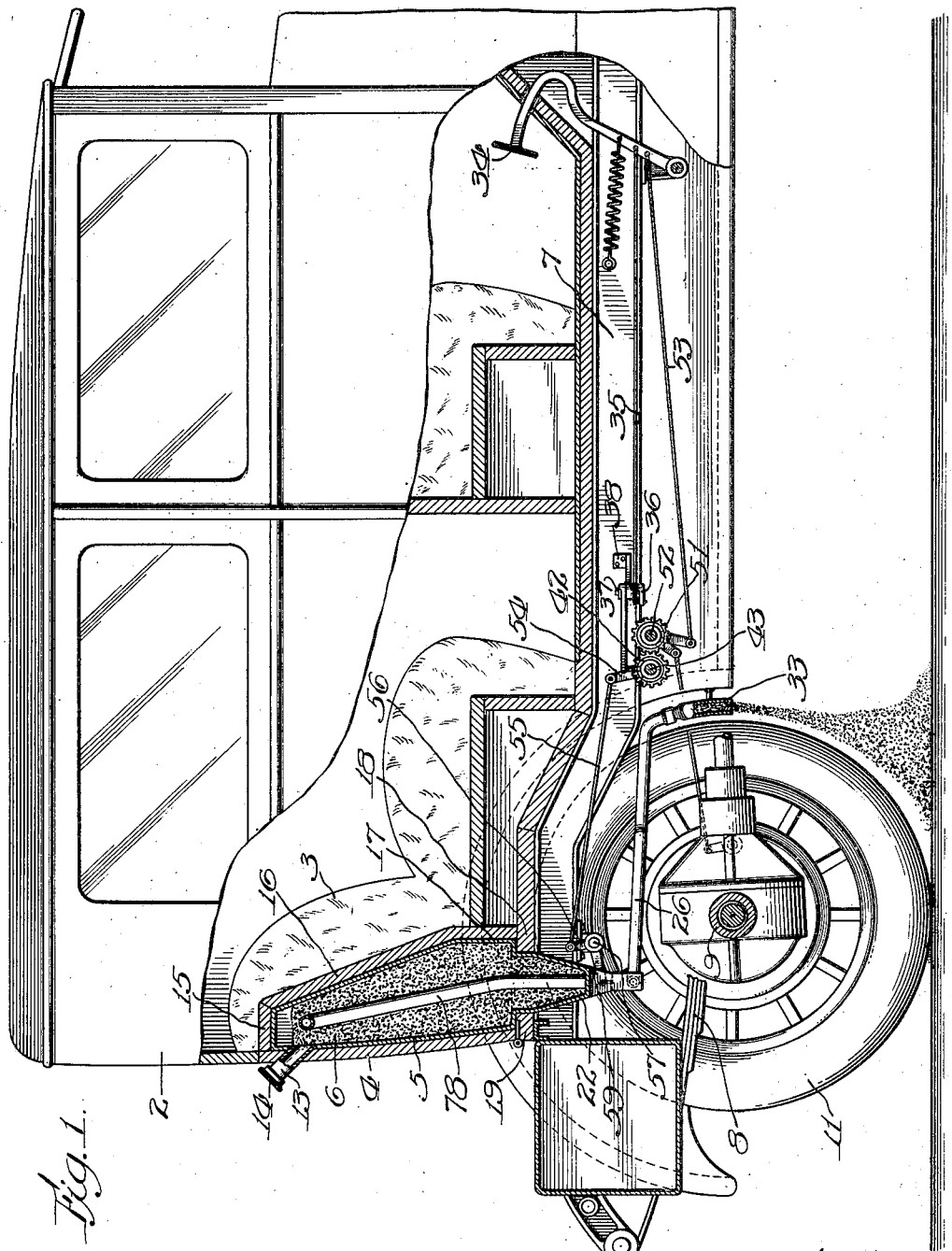

June 24, 1930.  J. N. REESE  1,765,772
SANDING DEVICE FOR AUTOMOBILES AND THE LIKE
Filed Sept. 18, 1926  3 Sheets-Sheet 3
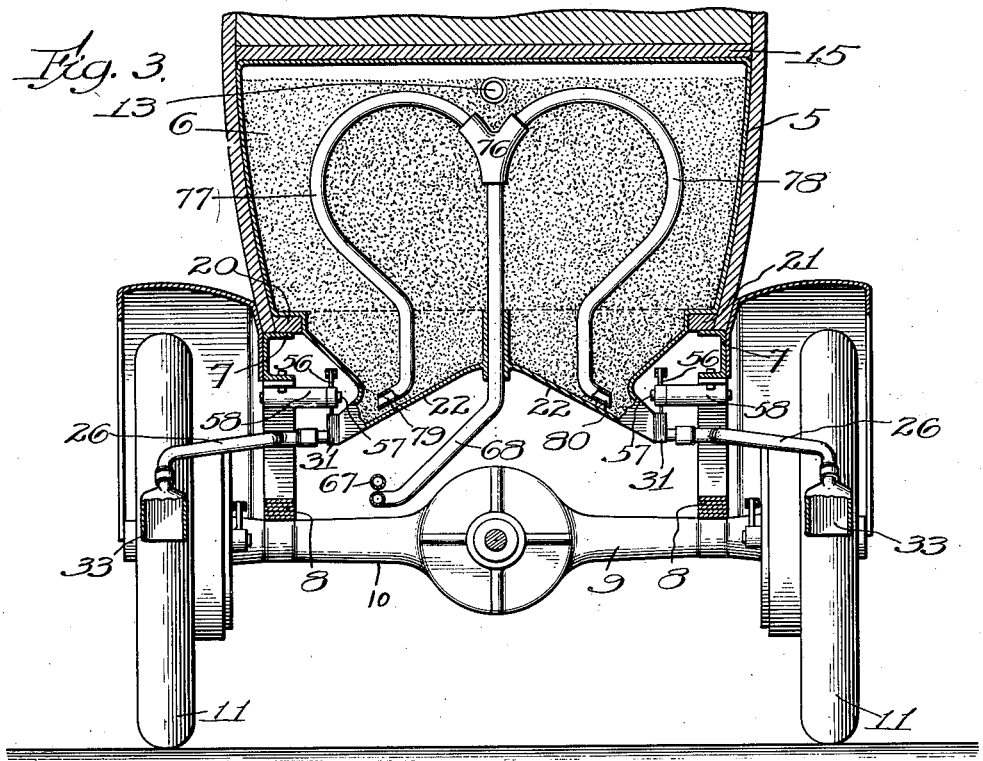
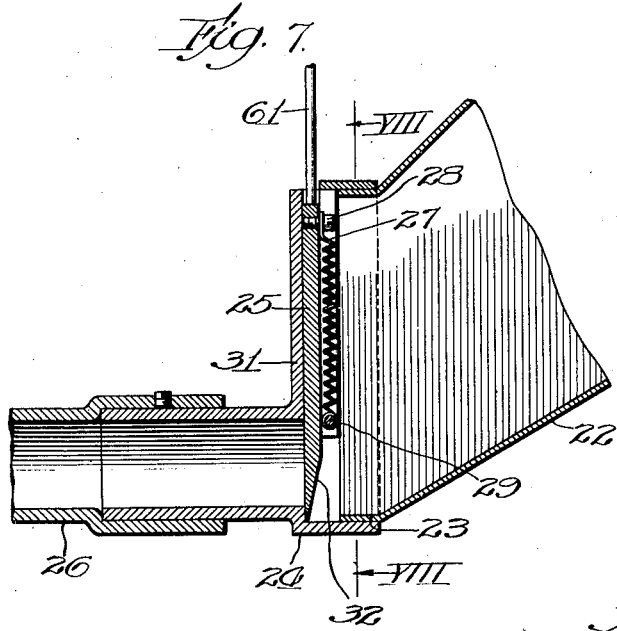
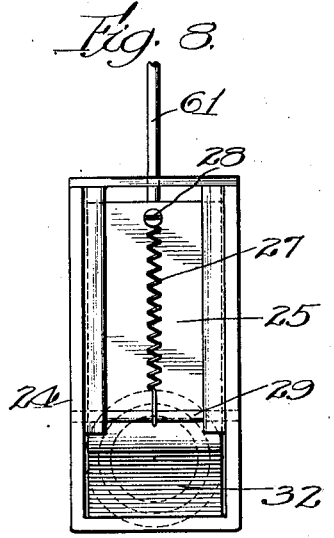
Inventor:
John N. Reese
By: Ira J. Wilson, Atty Patented June 24, 1930

1,765,772

UNITED STATES PATENT OFFICE

JOHN N. REESE, OF CHICAGO, ILLINOIS

SANDING DEVICE FOR AUTOMOBILES AND THE LIKE

Application filed September 18, 1926. Serial No. 136,235.

The invention disclosed in this application pertains generally to automobiles, whether operated by steam, electricity, internal combustion engines, or otherwise, although more particularly and preferably to automotive vehicles having an internal combustion engine in order that the exhaust gases may be utilized to perform one of the desirable functions of my invention which would otherwise be dependent upon expensive apparatus for the production of fluid pressure.

It has heretofore been considered impractical to equip a trackless automotive vehicle of the pneumatic or solid tire type with any means for preventing skidding other than may be accomplished with chains, equalized braking, or the so-called non-skid tire treads and like devices. It has not been deemed feasible or practical to provide means for applying sand or other similar material in front of the driving or idling or driven wheels of an automobile, and to my knowledge the nearest approach to any means for accomplishing this object is the ordinary sand cart or truck which bus companies and the like run around the city streets and roads with men equipped with shovels to throw the sand over the slippery pavement. This old method of distributing sand on slippery pavements has worked out very advantageously for everyone utilizing those streets or roads over the surface of which sand has been spread, but it does not obviate the dangerous condition due to slippery pavements over those roads and those places where the average automobile driver is wont to go. The lack of a sanding device as a part of each automobile's equipment has perhaps long been felt, and the need becomes greater as time goes on.

One of the primary objects of my invention is to provide a device with which each and every automobile now constructed and in use may be equipped, and with which every automobile under construction may be initially equipped, adapted to apply sand, gravel, or like non-skid material under the control of the operator or driver of the vehicle to the ground in front of the wheels, any or all of them if desired, so that when the brakes are applied, the slippery surface of the tires will effectually grip the material and the surface of the road and prevent the vehicle from skidding or sliding.

Another object is to provide a device of the character specified which may be positioned in a convenient place in or on the vehicle which will not interfere with the carrying space desired and one which will add, through its weight and the weight of the sand or other anti-friction material carried by it, to the efficiency of the acceleration or deceleration of the vehicle.

A still further object is to provide a device of the character specified which will be simple and cheap to manufacture, easy to install, and sure and effective in use.

Still further objects, including the details of construction, arrangement of parts, and the arrangement of the device with respect to the vehicle will be or should become well appreciated after studying the following description and claims and after viewing the accompanying drawing, in which:

Fig. 1 is a side elevational view of a portion of an automobile vehicle of the internal combustion engine type taken partly in section on the line I—I of Fig. 2, Fig. 2 is a top plan view of the chassis of the vehicle shown in Fig. 1, some parts in section,

Fig. 3 is a sectional view taken partly on the line III—III of Fig. 2 and partly along a line to the rear of the line III—III, Fig. 4 is a sectional view taken on the line IV—IV of Fig. 2,

Fig. 5 is a sectional view taken on the line V—V of Fig. 4,

Fig. 6 is an enlarged detail view of a clutch mechanism shown in a smaller scale in the plan view of Fig. 2,

Fig. 7 is a vertical sectional view of one of the sand control devices taken on the line VII—VII of Fig. 2, and Fig. 8 is a vertical sectional view transverse to the section of Fig. 7, taken on the line VIII—VIII of Fig. 7.

Referring to the drawings:

The inclosed body of the vehicle is indicated generally by the numeral 2, and includes a back seat 3 and a rear wall 4 between which I prefer to place a tank 5 adapted to serve as a storage bin or reservoir for sand or other non-skid matter.

The vehicle illustrated may be any one of the numerous types of vehicles of its class on the market, and since these are well-known to almost every one, no need of describing the various details of the construction is apparent, other than to say that the body 2 is usually mounted on chassis frame members 7, in turn supported through springs 8 above the axle housings 9 and 10, and other running gear including driving wheels 11 and driven or idling wheels 12.

The tank or storage bin or reservoir 5 is preferably built into the body in such a manner that it will not detract from the appearance of the vehicle and is preferably equipped with some means for feeding it sand or the like, such as a pipe 13 provided with a cap 14, although it will be apparent that other constructions and arrangements may be made for the same purpose. The storage reservoir is shown in the location illustrated because this is believed to be the most convenient and accessible position for it and because the weight of the tank and the material it contains will greatly aid in increasing the efficiency of the vehicle during acceleration and deceleration, because of the greater tractive effort it gives to the driving wheels 11. The tank 5 is shown as extending over the full width of the vehicle and as having substantial height and depth fore and rear of the vehicle to provide storage space for the reception of a large amount of sand or the like. The rear side of the tank is protected by the back member 4 of the automobile, while its top and interior faces are preferably protected by sheathing 15, 16, and 17.

The bottom of the tank 5 is supported in any suitable manner as by members 18, 19, 20 and 21, and is formed adjacent each side of the vehicle into funnel or spout shape as indicated at 22 in order that the sand or other material 6 may flow therethrough under the influence of gravity. Each funnel portion 22 is connected in a portion 23 adapted to be telescopically received in a chute or pipe coupling member (see Figs. 7 and 8) in which a gate or control member 25 is slidably arranged and normally urged downwardly to close communication between the portion 22 of the tank and a pipe conduit or chute 26 by means of a spring 27 which at one end is connected to the slide or gate 25 by means of a screw 28 and at its other end is secured to a transverse member 29 secured in the walls of the gate housing 24. The slide 25 is adapted to maintain tight contact with the surface of the adjacent wall 31 and has its lower end bevelled off on the up-stream side, as shown at 32, in order to maintain it in this position when cutting off the flow of sand and in order to permit it to be forced under the influence of the spring 27 to the bottom of the sand tending to flow past it.

When the gate 25 is raised, the sand is permitted or forced to flow through the conduits or pipes 26 to nozzles or spreading devices 33 located in front of the rear or driving wheels of the vehicle and through other pipes, not shown, to the front wheels of the vehicle where it spreads itself out in a normal even coating on the ground or surface of the pavement in front of the vehicle wheels as the vehicle moves along. It will, of course, be appreciated that if for any reason it should be desired to spread sand to the rear of the wheels in case the vehicle is moving backward, conduits and nozzles, similar to the conduits and nozzles 26 and 33 respectively, may be arranged to the rear of the wheels for the purpose, and it will also be appreciated that suitable cleats and other supports may be provided for the conduits and nozzles as and where desired.

The slides 25 may be controlled separately through any approved mechanism, but I prefer to have them controlled by the operator through a foot pedal 34 which is preferably placed adjacent the foot brake pedal 35 in order that either or both of them may be utilized without utilizing the other, and in order that both, if necessary, may be depressed at the same time to apply the brakes and spread sand simultaneously. The foot pedals are of course pivoted on the frame of the machine in any suitable manner, as is well understood, and a rod 35 is connected with the sand control pedal lever at one end, and through one arm 36 of a bell crank lever which is pivoted at 37 to a bracket 38 attached to the frame of the car, to one element 39 of a clutch member, the other element of which, designated 41, is connected to a pinion 42 mounted on a rock shaft 43. The other arm 44 of the bell crank lever is provided with a roller 45 at its outer end adapted to roll between collars 46 and 47 of the clutch member 39 which is splined on the rock shaft 43 in order that movement of the bell crank lever upon its pivot may urge the clutch elements 39 and 41 into engagement with one another and hold them in interengagement while the shaft 43, which is rotatably mounted in the frame members as shown at 48 and 49, is rotated through interengagement of the pinion 42 with a similar pinion 51 secured on the rock shaft 52 rotatably supported in the frame members and adapted to be rocked by the brake rod 53 through the intermediary of the brake pedal 35. To the rock shaft 43 adjacent each end thereof, a lever 54 is secured and pivotally connected to one end of a rod 55 which, at its opposite end, is pivotally connected to one arm 56 of a bell crank lever which is pivoted on a stub shaft 57 secured in a bracket 58 attached, as shown in Figs. 1 and 3, to the frame member 7 of the machine.

The other arm 59 of this bell crank lever is pivotally connected to the upper end of a rod 61 connected to the sand gate 25 preferably through a lost motion connection, as will be well understood. It will thus be apparent that upon simultaneously pressing the brake and sand control pedals 35 and 34 respectively, or upon pressing the sand control pedal 34 and then the brake pedal 35, the clutch members 39 and 41 will be interengaged with one another and the rock shaft 52 when rocked by movement of the brake pedal and brake rod 53 will not only apply the brakes, but at the same time, through the intermediary of pinions 42 and 51, will rock shaft 43 to raise the sand gates 25 and permit the sand to flow from the funnel portions 22 of the sand reservoir into the conduits 26.

When the sand in the sand reservoir is dry and loose, and when clearances permit a continuous downward slope for travel of the sand from the reservoir to the nozzles 33, the normal vibration of the body of the vehicle in passing over the roadway will cause the sand to flow out of the nozzles under the influence of gravity and without the aid of any positive impelling device when the control mechanism is operated to raise the sand control gates 25. However, if the sand in the reservoir be damp or moist or fine and tightly packed therein, or because of any other condition or circumstance should not be loose enough to flow under the influence of gravity, it is desirable to have some means of forcing it through and out of the conduits 26 under a reasonable pressure. For this purpose, I have shown the sanding device as connected up with the exhaust pipe of the internal combustion engine of the vehicle preferably at the discharge end of the muffler 62.

The end of the muffler is provided with a double gate mechanism 63 which fits closely over the end thereof as shown at 64 and which is provided with tubular bosses 65 and 66, the boss 65 being adapted to receive the usual exhaust pipe extension 67 and the boss 66 being adapted to receive a pipe 68 leading into the sand container or reservoir 5.

Normally, a gate 69 closes the pipe 68 to the exhaust gases and is held in its closed position under the influence of a spring 71 surrounding a gate operating rod 72 and abutting between one interior wall of the double gate mechanism and the top of the gate 69, and as will be clearly apparent from Figs. 4 and 5, the exhaust gases from the muffler are free to pass through the exhaust pipe extension 67 to the atmosphere. A lever 73 secured to the rock shaft 43 is pivotally connected to the rod 72 as at 74 and through a lost motion connection including a slot 75, so that when the rock shaft 43 is operated to open the gates 25, the gate 69 will be raised to substantially or completely cover the opening to the exhaust pipe extension and to open the pipe 68 to receive the exhaust gases passing through the muffler.

The gases received into the pipe 68 pass therethrough to a Y 76 where they are forced into two paths by pipes 77 and 78 which extend down through the sand reservoir in a tortuous path and terminate in open ends 79 and 80 in the funnel shaped bottom portions 22 of the reservoir. The orifices of the pipes 77 and 78 are directed downwardly in the general direction of the flow of sand through the portions 22 of the reservoir and when the hot exhaust gases issue therefrom with the gates 25 raised, the sand will be forced under reasonable pressure through the conduits 26 and out the nozzles 33. The gases will be prevented from passing in any other direction partially by reason of the direction in which they are projected by the terminal ends of the pipes 77 and 78 and partially by the compactness of the sand above their point of issuance from the pipes 77 and 78. The heated gases will serve to dry out and prevent freezing of the moist sand in the sand reservoir or tank by reason of their tortuous passage through the reservoir and will thereby maintain an even flow of sand into the conduits 26.

It is believed that the numerous advantages and novel features of my invention, as well as the operation illustrated and described herein will be thoroughly appreciated and it should be understood that my invention is susceptible of adaptation in many ways bearing little or no structural resemblance to the structure shown in the accompanying drawings. For such reasons I do not desire to be limited by what I have shown and described for the purpose of illustrating my invention, but only by the spirit of the invention and the scope of the appended claims.

I claim:

1. In combination with an automotive vehicle having wheels and an internal combustion engine, means for distributing sand in front of one of said wheels, a sand reservoir having an outlet connected with said means, a conduit for the engine exhaust extending into the sand in said reservoir to heat the sand and adapted to discharge exhaust gases into the sand in said reservoir adjacent the reservoir outlet to impel the sand toward said outlet and said distributing means.

2. In combination with an automotive vehicle having wheels and an internal combustion engine, means for distributing sand in front of one of said wheels, a sand reservoir having an outlet connected with said means located in the rear end of the vehicle behind the vehicle seat, said reservoir having said outlet in its lowermost position, and a conduit for the engine exhaust extending through the sand in the reservoir adapted to discharge exhaust gases into said reservoir only into the sand near and toward said outlet.

3. In combination with an automotive vehicle having wheels and an internal combustion engine, means for distributing sand in front of said wheels, a sand reservoir having an outlet connected with said means, and a conduit for the engine exhaust extending into the sand in said reservoir and having a discharge port only near said outlet for positively blowing the sand toward and through said outlet.

4. In combination with an automotive vehicle having wheels and an internal combustion engine, means for distributing sand in front of one of said wheels, a sand reservoir located in a wall of the vehicle above the vehicle chassis adapted to discharge by gravity alone, a connection between the reservoir and said distributing means, and a conduit for the engine exhaust extending through the sand in the reservoir to heat it and adapted to direct exhaust gases into the sand in the reservoir only adjacent and toward said connection.

5. In combination with an automotive vehicle having wheels and an internal combustion engine, means for distributing sand in front of one of said wheels, a sand reservoir having an outlet connected with said means, and an exhaust gas conduit extending through the sand in said reservoir for heating the sand and having a port within the reservoir near the outlet of said reservoir for discharging exhaust gas against the sand to blow it toward and through said outlet into the distributing means.

6. In combination with an automotive vehicle having wheels and an internal combustion engine, means for distributing sand in front of one of said wheels, a sand reservoir located inside of an outer wall of the vehicle above the chassis having an outlet connected with said means, and an exhaust gas conduit extending a substantial distance through said sand and having a port immediately adjacent said outlet for discharging gas toward said outlet to impel sand through said outlet into the distributing means, the disposal of the conduit in the sand being adapted for heating the sand.

7. In combination with an automotive vehicle having wheels and an internal combustion engine, means for distributing sand in front of both rear wheels, a sand reservoir disposed adjacent the rear upwardly extending wall of the vehicle above the chassis, said reservoir having an outlet in its lowermost portion connected to said means, the reservoir outlet and the distributing means being adapted to facilitate discharge of the sand by gravity alone, and an exhaust gas conduit extending a substantial distance through the sand in the reservoir for heating it and having a discharge port adjacent said outlet adapted to discharge gas only into the sand adjacent and toward said outlet.

8. In combination with an automotive vehicle having wheels and an internal combustion engine, means for distributing sand in front of both rear wheels, a sand reservoir disposed above the chassis adjacent the rear upstanding wall of the vehicle behind the rear seat, said reservoir having a pair of laterally disposed outlets connected to the distributing means, and exhaust gas conduits extending a substantial distance through the sand in the reservoir and having discharge ports adjacent said outlets adapted to discharge gas into the sand adjacent said outlets and to impel sand toward said outlets.

9. In combination with an automotive vehicle having wheels and an internal combustion engine, means for distributing sand in front of one of said wheels, a sand reservoir disposed adjacent an upstanding wall of the vehicle behind a vehicle seat above the chassis, said reservoir having an outlet connected with said distributing means and adapted for the discharge by gravity of sand from the reservoir to said means, and an exhaust gas conduit extending into the sand a substantial distance to heat the sand in the reservoir and having a discharge port adjacent said outlet for discharging gas into the sand toward said outlet and to impel sand through said outlet and distributing means.

10. A sanding device comprising, a sand box, a nozzle, means for establishing communication between the nozzle and the interior of the box, and means for conveying a heated fluid through the box to heat the sand and further discharge the fluid into said nozzle to facilitate the passage of sand to the nozzle and its discharge therefrom.

11. In combination with an internal combustion engine, a sanding device comprising a sand box, a tube extending the length of the box and embedded in the sand, said tube having its inlet directly connected to the exhaust of the engine, and means for discharging sand in close proximity to the outlet end of said tube.

In witness of the foregoing I affix my signature.

JOHN N. REESE.